(12) United States Patent
Mercanti

(10) Patent No.: US 10,912,318 B2
(45) Date of Patent: *Feb. 9, 2021

(54) FAST-FREEZING CHOPPED TENDER HERBS

(71) Applicant: Herbs Unlimited Corporation, Clarks Green, PA (US)

(72) Inventor: Ann Marie N. Mercanti, Basalt, CO (US)

(73) Assignee: HERBS UNLIMITED CORPORATION, Clarks Green, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,790

(22) Filed: Dec. 18, 2018

(65) Prior Publication Data

US 2019/0116848 A1 Apr. 25, 2019

Related U.S. Application Data

(63) Continuation of application No. 13/979,318, filed as application No. PCT/US2012/020953 on Jan. 11, 2012, now Pat. No. 10,194,681.

(60) Provisional application No. 61/431,709, filed on Jan. 11, 2011.

(51) Int. Cl.

| A23L 3/36 | (2006.01) |
| A23L 3/375 | (2006.01) |
| A23B 7/04 | (2006.01) |
| A23B 7/148 | (2006.01) |
| F25D 3/12 | (2006.01) |

(52) U.S. Cl.
CPC ............ *A23L 3/363* (2013.01); *A23B 7/0433* (2013.01); *A23B 7/148* (2013.01); *A23L 3/375* (2013.01); *A23B 7/0425* (2013.01); *A23L 3/361* (2013.01); *F25D 3/12* (2013.01)

(58) Field of Classification Search
CPC .......... A23L 3/361; A23L 3/363; A23L 3/375; A23B 7/0425; A23B 7/0433; F25D 3/12

USPC ................................................. 426/393, 615
See application file for complete search history.

(56) References Cited

U.S. PATENT DOCUMENTS

| 5,093,145 A | 3/1992 | Darbonne et al. |
| 5,227,183 A | 7/1993 | Aung et al. |
| 5,252,347 A | 10/1993 | Darbonne |
| 5,338,558 A | 8/1994 | Aung et al. |
| 5,702,750 A | 12/1997 | Darbonne |
| 5,858,446 A | 1/1999 | Lewis et al. |
| 6,210,725 B1 | 4/2001 | Colombo |
| 2003/0175392 A1 | 9/2003 | Garwood |
| 2004/0163973 A1 | 8/2004 | Longo |
| 2007/0084232 A1 | 4/2007 | Whewell |
| 2008/0305222 A1 | 12/2008 | Takenaka |

FOREIGN PATENT DOCUMENTS

| BE | 809014 A | * | 4/1974 | ............. F25D 3/127 |
| JP | 2010088326 A | * | 4/2010 | .......... C08L 2666/04 |

OTHER PUBLICATIONS

Ron Kurtus; "Dry Ice is the Solid State of Carbon Dioxide"; Dec. 1, 2005; http://www.school-for-champions.com/science/matter_states_dry_ice.htm#.WXwZQf7rtmN pp. 11. (Year: 2005).*

Degradation of Polyphenolic Antioxidants in Blueberry Nectar Aseptically Filled in PET, Acta Chimica Slovenica;2009, vol. 56 Issue 2, p. 494, Jun. 2009. (Year: 2009).*

Using Dry Ice to preserve your food obtained from http://www.angelfire.com/mo3/abcdefg200/survlib/library2/upack/dryice.htm; $ pages, Date Sep. 11, 2004. Date verification webarchive.org (Year: 2004) (Year: 2004).*

* cited by examiner

*Primary Examiner* — Jyoti Chawla
(74) *Attorney, Agent, or Firm* — Morgan, Lewis & Bockius LLP

(57) ABSTRACT

An exemplary method for preserving fresh herbs includes obtaining fresh trimmings from a plant, grinding and/or chopping the fresh trimmings to form processed trimmings, packaging the processed trimmings in a container, and freezing the processed trimmings in the container. Freezing the processed trimmings may include subjecting the processed trimmings to a dry ice atmosphere.

20 Claims, 1 Drawing Sheet

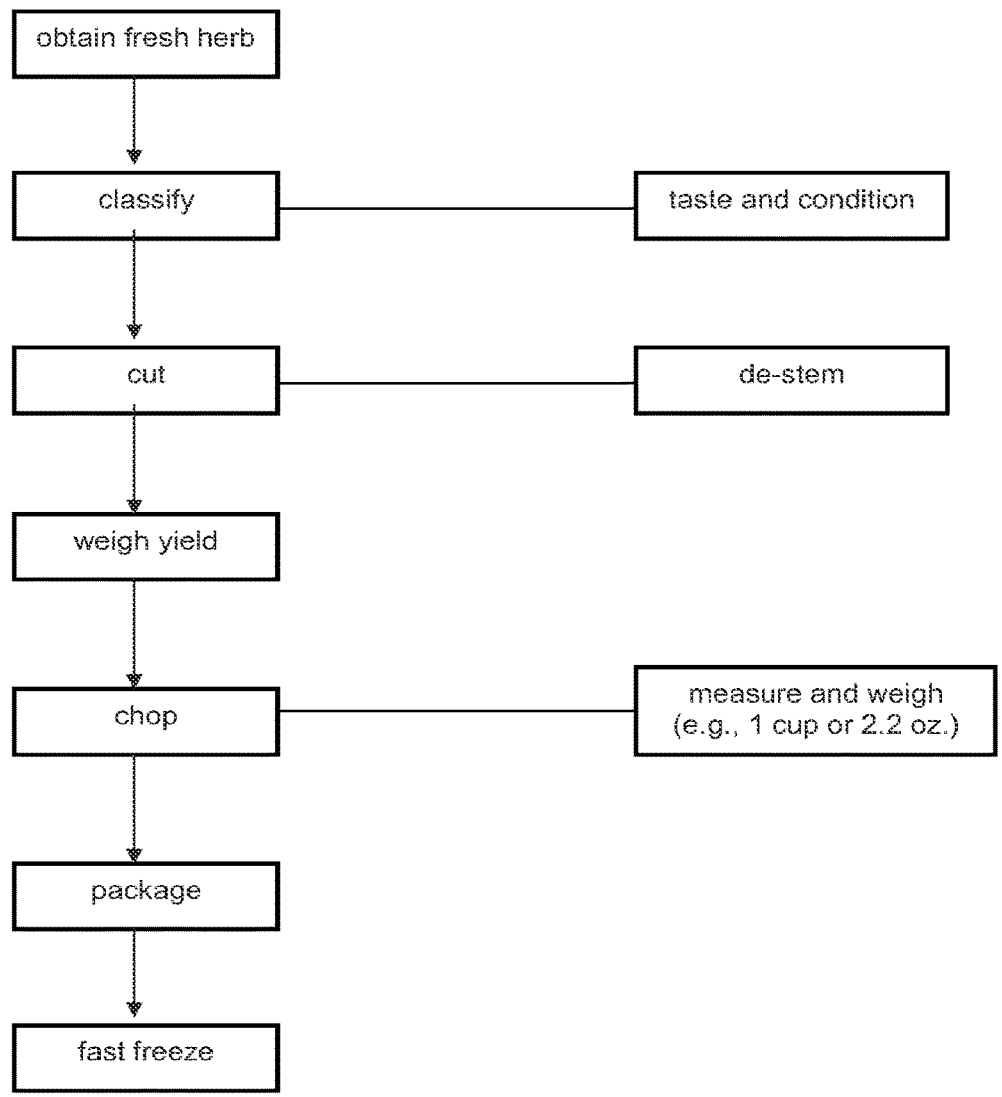

FAST-FREEZING CHOPPED TENDER HERBS

CROSS REFERENCE TO RELATED APPLICATIONS

This application is a continuation of U.S. patent application Ser. No. 13/979,318, filed Jan. 11, 2012, which is a U.S. National Stage of International Application No. PCT/US2012/020953, filed Jan. 11, 2012, which claims the benefit of U.S. Provisional Patent Application No. 61/431,709 filed Jan. 11, 2011, each of which is incorporated herein by reference in its entirety.

BACKGROUND OF THE INVENTION

The present invention generally relates to the art of processing and preserving leafy green plants, as well as to the art of processing other types of plants.

BRIEF DESCRIPTION OF THE DRAWINGS

FIG. 1 is a schematic illustration of an embodiment of the invention.

DETAILED DESCRIPTION OF THE INVENTION

In an embodiment, the invention relates to the treatment and processing of aromatic herbs, weeds or buds of plants that are harvested quickly after cutting from the mother plant and then quickly freezing the harvested material. In an embodiment, harvesting occurs within 24, 23, 22, 21, 20, 19, 18, 17, 16, 15, 14, 13, 12, 11, 10, 9, 8, 7, 6, 5, 4, 3, 2, 1, 0.5, or 0.1 hours of cutting from the mother plant. In one embodiment, harvesting occurs within twelve hours of cutting from the mother plant. In another embodiment, harvesting occurs within 24, 30, 36, 42, 48, 54, 60, 66, 72, 78, 84, 90, or 96 hours of cutting from the mother plant. It will be understood that one or more of many considerations may affect the decision as to the amount of time allowed to lapse between cutting and harvesting, including, but not limited to the effect of oxidation on the properties, characteristics and usefulness of the cuttings of any particular mother plant used.

The mother plant includes, but is not limited to, basil, chives, cilantro, dill, lovage, marijuana, mint, parsley, tarragon, and the like. Essentially, any green leafy herb, and in particular, plants which lose their flavor, integrity, nutrients and appeal during previous forms of processing. Hardened seeds are known as spices and are typically dried, and this type of seed is excluded from the process. The tender herbs described are hereinafter referred to as "plants". In one embodiment, the objective is to substantially preserve the full range of flavor, cannabidiol (CBD), cannabinol (CBN), cannabinoids, phytochemicals and antioxidants at the highest amount possible in the above mentioned plants. In one embodiment, the leaves and the flowers of the plant are preferably used. In one embodiment, the stem or most seeds of the plant may or may not be used. In an embodiment, the stem or most seeds of the plant are not used. In one embodiment, the tender leaves, flowers and immature seeds can be used in the process and compositions disclosed herein. In an aspect, the methods disclosed herein essentially place the product in a state of suspended animation, that is, there is no substantial further degradation of the freshness of the product after freezing. As described herein, with proper handling and minimization of processing, the most benefit is derived from the plant. By way of a non-limiting example, flavor is at its peak, essential oils are preserved, as close as possible to the condition of the plant when it was freshly picked, and phytochemicals are present and available to be absorbed into the body upon ingestion.

In an embodiment, the mother plants are grown in any manner traditionally known in the art for growing such plants. Plants can be grown indoors or outdoors, or a combination of both. As will be understood by the skilled artisan, in order to obtain the most robust mother plants, growing conditions may be optimized. Such efforts at optimization include, but are not limited to, simulating an outdoors environment (e.g., wind, light, and nutrient adjustments) and growing the plants in a high tunnel. In an aspect, best organic practices can be used for growing the plants. In an embodiment, the mother plants are grown in soil. In an embodiment, the mother plants are grown hydroponically. In an embodiment, the mother plants are grown in sand or another non-soil substrate, which is supplemented as necessary.

The use of these fresh herbs has many health benefits in a culinary form. The uses are many and varied; any recipe that calls for fresh herbs is readily accessible in the amounts determined by the consumer's taste without the inconvenience currently experienced with dried, stale herbs. Herbs have been consumed for centuries for flavor characteristics as well as for medicinal benefits. In an embodiment, fresh herbs as disclosed herein are used to obtain one or more medicinal or therapeutic effects. In an aspect, fresh herbs as disclosed herein are used as an herbal supplement and/or in an herbal supplement formulation. With whole plant extracts kept in a fresh state, and with the use of whole plant previously shown to mitigate the symptoms associated with cancer, glaucoma, H1V/AIDS cachexia, severe pain, severe nausea, seizures (e.g., including those that are characteristic of epilepsy), persistent muscle spasms (e.g, including those characteristic of multiple sclerosis), Crohn's Disease, and Irritable Bowel Syndrome, among others. When these herbs, both culinary and cannabinoidal, are prepared according to the compositions and methods disclosed herein, an unexpected advance in integral health applications is achieved. The bioactive ingredients and the synergistic properties of whole foods can be easily accessed by simply cooking with them in, or infusing them with, quantities that suit the consumer or chef. The product and blends described herein have the same or virtually the same taste, mouthfeel, appearance and phytochemicals as the fresh plants. The processes disclosed herein allow for consistency and convenience, all while extending the shelf life of local harvests, among other benefits.

It will be understood that the compositions and methods encompassed herein can be used for any purpose, and the compositions and methods disclosed and contemplated herein are not limited to any particular use or utility. By way of a non-limiting example, the compositions and methods encompassed herein may be used to prepare therapeutic compositions, foodstuffs, ingredients to be used by an end user for their particular purposes or needs, and sources of specific agents, including, but not limited to phytochemicals.

Essential oils are dissipated or concentrated in aromatics during plant processing steps such as, but not limited to, drying, dehydrating, washing, blanching, coating, infusing, treatment with anti-browning agents (e.g., ascorbic acid, lemon juice), dipping in liquid nitrogen (IQF), adding samples to liquids to block freeze, dipping plants in high fructose corn syrups or glycerine, blocking enzyme activities, or treating with an osmotic agent of any sort. All of these techniques have been used in the art in order to achieve the desirable flavor, as well as the therapeutic and useful qualities of the plants as described herein. A freezing process such as any of those taught herein is advantageous as compared to what was previously known in the art, as the processes and compositions taught herein unexpectedly maintain a high level of freshness and potency for the processed plants.

In an embodiment, plants used in the compositions and methods of the invention are sourced locally as to keep the time away from the "mother plant" to a minimum. In another embodiment, plants used in the compositions and methods of the invention are not sourced locally. As will be understood by the skilled artisan, careful and proper handling of harvested plants will minimize the time away from the mother plant, and will maximize the quality and potency of the harvested plant until the plant is used in the compositions and methods disclosed herein. In other words, plants may or may not be sourced locally, provided that care is taken to maintain the freshness and integrity of the plants.

The methods disclosed herein include relatively minimal processing that does not degrade the leaves of the plant. Such methods have advantages of consistency, convenience and simplicity. These resulting compositions are advantageous in that the end user is able to add exact amounts of the processed herbs, and thereby, their essential oils and phytochemicals, to be absorbed in the state and forms virtually as fresh as the point of harvest of the plant. Other forms of preservation degrade or water down the "pure nature" of the plant for the sake of flow and ease of measure (e.g., the ease of shaking or pouring the herb into a measuring container that is typically used in cooking). In contrast, the compositions disclosed herein are packaged in measured amounts and can be lifted whole and cut into specific amounts by fractions or easily scooped into above mentioned measuring devices. In an embodiment, the present compositions can be used from the original container, eliminating the need for a "flow" factor and therefore all the subsequent additives and processing that accompanies such factors.

In another aspect, the management of moisture and oxidation, among other factors, are relevant to the compositions and methods disclosed herein. Plants are usually best in their original raw state, and optionally, manipulated after harvesting (as to the needs of the consumer, chef, or other end-user), yet due to the limitations of the seasonality and limited harvest time, all organic plants have a problem. Disclosed herein are compositions and methods to slow, diminish and/or stop the degradation threatened by air, time, and moisture, and to preserve the harvest at peak times with rigorous standards. In part, the compositions and methods herein maintain the plants' organoleptic qualities identical (or as close to identical as possible) to those grown and harvested fresh from a garden. In part, the methods and compositions disclosed herein make plants having these qualities available directly from the freezer, essentially making these fresh herbs a pantry item. In part, these methods and compositions also allow local farmers to provide produce for local processors at low-cost options. Shortened distribution chains save energy and keep local economies local, and further provide the surrounding community access to local produce year round.

In an embodiment, the moisture content of a trimming that is chopped, ground or otherwise processed is kept substantially the same as the moisture content of the trimming at the time of harvesting. In an embodiment, the moisture content of the final processed product is substantially the same as the moisture content of the trimming at the time of harvesting. In an aspect, the moisture content of the final processed product is the same as the moisture content of the trimming at the time of harvesting. In an embodiment, the moisture content of the final processed product is about 50%, about 55%, about 60%, about 65%, about 70%, about 75%, about 80%, about 85%, about 90%, about 95%, about 96%, about 97%, about 98%, or about 99% of the moisture content of the trimming at the time of harvesting.

It will be understood that moisture may be added to the trimming during processing. In an embodiment, a method includes the elimination of substantially all added moisture. In another embodiment, a method includes the elimination of as much moisture as realistically possible, depending upon time available and ease of processing, among other factors. In an embodiment, substances other than moisture may be added to the trimmings during processing, as determined necessary or desirable by the skilled artisan, based, in part, on the desired properties of the final product and/or the intended use of the final product.

In an embodiment, as these tender herbs are the leaves of the plants, several cuttings are used at three week intervals. Allowing for a fuller re growth and the energy of the plant to not be diverted to flowering. For example, with basil plants, removing the top one third of the plant produces a greater yield and stops them from bolting or becoming bitter. As will be understood by the skilled artisan, each herb has its own best practices. For example, in the case of medical marijuana, the actual blossom is what contains the highest amount of phytochemicals, and is therefore the most desirable portion. The skilled artisan will know how to make this determination, based, in part, on the disclosure set forth herein.

In an embodiment, harvesting occurs within 24, 23, 22, 21, 20, 19, 18, 17, 16, 15, 14, 13, 12, 11, 10, 9, 8, 7, 6, 5, 4, 3, 2, 1, 0.5, or 0.1 hours of cutting from the mother plant. In another embodiment, the plants are preferably effectively processed within twelve hours of harvesting/cutting from the mother stem. In another embodiment, harvesting occurs within 24, 30, 36, 42, 48, 54, 60, 66, 72, 78, 84, 90, or 96 hours of cutting from the mother plant. It will be understood that one or more of many considerations may affect the decision as to the amount of time allowed to lapse between cutting and harvesting, including, but not limited to the effect of oxidation on the properties, characteristics and usefulness of the cuttings of any particular mother plant used. By way of a non-limiting example, the time between processing and harvesting and/or cutting is selected based on the desired properties of one or more polyphenols. In an aspect, the decision is based on minimizing oxidation and/or degradation of one or more polyphenols after harvesting and/or cutting. By way of another non-limiting example, the time between processing and harvesting and/or cutting is selected based on the desired properties of one or more phytochemicals. In an aspect, the decision is based on minimizing oxidation and/or degradation of one or more phytochemicals after harvesting and/or cutting.

In an embodiment, a method of preparing an herb includes obtaining trimmings by trimming fresh clean field plants by ⅓ of total plant height at the proper time. In another embodiment, more than ⅓ of the total plant height is trimmed at the proper time. In yet another embodiment, less than ⅓ of the total plant height is trimmed at the proper time. As set forth above, the skilled artisan will know how to make the determination of how much of the plant to trim at a given time, and will know, based on the disclosure set forth herein, how to determine the effectiveness and the freshness of the plant obtained based on any given trimming method. By way of a non-limiting example, if it is found that trimming ½ of the plant height provides more potency than trimming ⅓ of the plant height, and the remaining plant grows just as well, it may be concluded that trimming ½ of the plant height is the best method for processing that particular plant. In another embodiment, the whole leaf of a plant is used.

In an embodiment, the trimmings are collected from plants not having any moisture due to rain or dew. In another embodiment, trimmings are collected from plants not having any wilt due to full sun exposure and mid-day temperatures, as described herein. In an embodiment, trimmings may be collected from plants containing moisture and/or having wilt. The skilled artisan will know, based on the disclosure set forth herein, how to determine whether the moisture and/or wilt has had any detrimental effect on the plant, and then, whether the plant will still be useful for the methods and compositions set forth herein In an embodiment, the green leaves are batched and de-stemmed at a temperature between 40° F. and 80° F. In another embodiment, the green leaves are batched and de-stemmed at a temperature below 40° F. In another embodiment, the green leaves are batched and de-stemmed at a temperature above 80° F. In an embodiment, the green leaves are batched and de-stemmed at a temperature between 40° F. and 60° F. In another embodiment, the green leaves are batched and de-stemmed at a temperature between 45° F. and 55° F. In an embodiment, the green leaves are de-stemmed and batched to be weighed for raw yield, at a controlled temperature of about 50° F. In another embodiment, the green leaves are batched and de-stemmed at or at about room temperature, or approximately 70° F.

In an embodiment, the plant is chopped by placing approximately 0.04 ounces of leaves into a food processor. In an embodiment, the amount of plant/leaves used can be increased or decreased, depending upon various factors, including, but not limited to, size of the device used, size of the accessories (e.g., blades) or containers on the device used, capabilities of the device and accessories used, throughput of the device used, characteristics of the plant which make it either easy or difficult to process, and intended use of the processed plant, among other things. In an embodiment, the amount of plant used may or may not depend upon size of the processing device and optionally, depend upon the size of the container or bowl which contains the plant for processing on the processing device. In an embodiment, the blades of a food processor or other processing device are optionally carbide-tipped.

In an embodiment, the plant is chopped by placing approximately 0.04 ounces of leaves into a food processor with a reversible motor and double sided blade. This allows for a grind and chop function that, when quickly alternated, continuously aerates the product without damage to the tender leaf. It will be understood that the variations and adjustments described herein can be selectively made by the skilled artisan in order to optimize the efficiency, quality, and/or specific characteristics of the processed plant. In an embodiment, approximately 0.03-0.05 ounces of trimmings are used. In another embodiment, 0.01-0.1 ounces of trimmings are used. In an embodiment, about 0.01, about 0.02, about 0.03, about 0.04, about 0.05, about 0.1, about 0.5, about 1.0, about 2.5, about 5.0, about 7.5, about 10, about 20, about 30, about 40, about 50, about 75, about 100, about 250, about 500, about 750, or about 1,000 ounces of trimmings are used. In another embodiment, the amount of trimmings used is empirically determined based on the nature and characteristics of the particular trimmings used (e.g., light and bulky versus small and dense, trimmings more prone or less prone to degradation over unit time, etc. . . . ). Based on the disclosure herein, the skilled artisan will understand whether more or less trimmings, by weight, should be used for a particular preparation. In part, the choice of weight of trimmings to use will depend upon the size and efficiency of the device used to chop the trimmings.

In an aspect, chopping is conducted by alternating chop and grind functions of a suitable food processor. In an embodiment, chopping is conducted by alternating chop and grind functions of a suitable food processor at 3 second intervals for 18 seconds, always ending on the reverse function for fluffing of the chopped product and reduction of weeping and bruising. The amount of time used for each interval of chopping, as well as the total amount of time used for chopping, can be adjusted based on the desired end result. The skilled artisan will understand that this determination will also be made based on the stability, nature, and characteristics of the plant (i.e., trimmings or leaves) being subject to chopping. For example, certain plants may not withstand extended chopping and still remain useful for purposes of intended bioactivity or therapeutic quality.

In an embodiment, in order to minimize oxidation, weeping of moisture and darkening of the plants, no more than about five minutes time is allowed to pass from the initial chopping to the initiation of the freezing of the choppings. However, based on the disclosure set forth herein, the skilled artisan will know how to determine the allowable or the most suitable period of time, in part, to minimize unfavorable outcomes and results, and to optimize favorable outcomes and results. In an embodiment, the time may be greater than five minutes. In an embodiment, the time may be about five minutes, about six minutes, about seven minutes, about eight minutes, about nine minutes, about ten minutes, about fifteen minutes, or about twenty minutes or more. In an embodiment, the time may be about five minutes. In an embodiment, the time may be less than five minutes. In an embodiment, the time may be about four minutes, about three minutes, about two minutes, about one minute, or less than about a minute.

Irradiation may also be used to process the harvested and/or chopped trimmings.

In an embodiment, a measuring cup of chopped plant is placed into a container suitable for freezing. In an embodiment, polypropylene, non-BPA recyclable plastic, seven-ounce wet-measurer containers are used. In an aspect, any container suitable for freezing and long term storage of the chopped plant is used. The skilled artisan will know that such suitable containers include any containers which can stand up to the rigors of low-temperature freezing, application of a vacuum, and/or which can retain an air-tight, or near air-tight seal over a desired period of time. In another embodiment, a container does not have an air-tight seal with a cover. In an aspect, a container includes an integral cover. In another aspect, a container is covered by a cover that is separate from the container. In an embodiment, a container and/or cover is comprised of a material that is not gas-permeable. In an embodiment, a container and/or cover is comprised of a material that is gas-permeable.

It will be understood that any discussion herein regarding use or manipulation of a container may encompass the container and the cover for the container, and further, may encompass the container with the cover fitted to the container so that the container is considered to be "closed", regardless of whether or not the cover forms an air-tight seal with the container. The term "lid" may be used herein to refer to a cover for a container, wherein the cover is specifically fitted to the container. A lid may or may not form an air-tight seal with a container.

In an embodiment, the container or package containing the chopped plant is placed into a simple cooler. In another embodiment, the container or package may be placed into any chamber which is almost air tight or which can be made to be air tight, if desired. In an embodiment, the container or package containing the chopped plant is placed into a low-temperature freezer. In an embodiment, dry ice can be used in the cooler or chamber to freeze the chopped plant. The dry ice can also act to create a vacuum seal in the container or package, and can also act to displace oxygen from the container or package. In an embodiment, dry ice is not used, but rather, another means of freezing a sample is used. Such means include, but are not limited to, an external refrigeration unit or liquid nitrogen. In an embodiment, two or more means of freezing a sample are used, including, but not limited to dry ice, liquid nitrogen, an external refrigeration unit, and sample preparation in a suitable cold natural or artificial environment. In an embodiment in which dry ice is not used, vacuum sealing of a container or package may be effected by any means known to create a vacuum, including, but not limited to, a direct external vacuum source. In an embodiment in which dry ice is not used, oxygen can be evacuated by any means of evacuating a gaseous atmosphere, including, but not limited to, creation of a vacuum and displacement of oxygen with a non-oxygen containing gas. In an embodiment, a package is processed by leaving the package unsealed. As will be understood by the skilled artisan, a package may be unsealed by breaking the seal of a lid, slightly opening the lid, or completely removing the lid, or any degree of unsealing the package between a complete, intact seal and no seal whatsoever. The package can also be processed by using any method or mechanism of reversible sealing a package, including, but not limited to a one-way valve, a two-way valves, two or more valves of any type, and the like. In another embodiment, methods of sealing and/or unsealing a package are affected by or are a result of the type of packaging used.

In an embodiment, trimmings from a plant are frozen or preserved prior to placing the trimmings in a container. In an embodiment, trimmings from a plant are frozen or preserved after placing the trimmings in a container.

In an embodiment, blends of trimmings may be prepared by combining, or by combining in a single container, trimmings from two or more different plants. In an embodiment, blends of trimmings may be prepared by combining, or by combining in a single container, trimmings from two or more different sources of the same plant. In yet another embodiment, blends of trimmings may be prepared by combining, or by combining in a single container, trimmings from two or more different sources of the same plant, in addition to trimmings from two or more different plants.

In an embodiment, frozen trimmings are placed into a container containing other trimmings, wherein the other trimmings are from the same plant as the frozen trimmings and/or from one or more different plants than the frozen trimmings. In an embodiment, frozen trimmings are removed from a container in which they were frozen, then placed into a container containing other trimmings, wherein the other trimmings are from the same plant as the frozen trimmings and/or from one or more different plants than the frozen trimmings. In an aspect, the order of steps for placing plant trimmings into a container and for freezing the plant trimmings is not specified, nor essential to the method disclosed herein. In another aspect, the order of steps for placing plant trimmings into a container and for freezing the plant trimmings is important for a method disclosed herein. In an embodiment, the plant trimmings are placed into a container prior to freezing. In another embodiment, the plant trimmings are frozen prior to being placed into a container.

While not wishing to be bound by any particular theory, there are at least several aspects of the disclosure set forth herein which may contribute to the advantageous results obtained using the methods and compositions set forth herein. In certain embodiments, the decreased or eliminated exposure to ambient oxygen may contribute to the advantageous results. In certain embodiments, the advantageous results may be a result, at least in part, of the fact that the plant cell walls may remain intact after processing due to the methods used to process the plants.

In an embodiment, a processed plant prepared according to the methods and compositions disclosed herein remains fresh and/or potent, as described elsewhere herein, for a longer period of time than the plant otherwise would in the absence of being processed as described herein. In an embodiment, a processed plant prepared according to the methods and compositions disclosed herein remains fresh and/or potent for about 2, about 3, about 4, about 5, about 6, about 7, about 8, about 9, about 10, about 15, about 20, about 25, about 30, about 35, about 40, about 45, about 50, about 75, about 100, about 500, or about 1,000 times longer than the plant otherwise would in the absence of being processed as described herein. In an embodiment, a processed plant prepared according to the methods and compositions disclosed herein remains fresh and/or potent for more than 100 times longer than the plant otherwise would in the absence of being processed as described herein.

In an embodiment, limiting physical and/or chemical damage to cells may enable the preservation of one or more phytochemical components of the plant. In an embodiment, physical and/or chemical damage to cells may not alter the phytochemical components of the plant. In an embodiment, a processed plant prepared according to the methods and compositions disclosed herein remains fresh and/or potent for a longer period of time than the plant otherwise would in the absence of being processed as described herein, and this improvement is quantitatively determined. In an embodiment, the improvement in freshness, potency, stability, or desirability is quantified by measurement of inhibition of polyphenol oxidation. That is, the improvement is measured by demonstration that there is less polyphenol oxidation in the processed sample than in an unprocessed sample (or a sample processed using a method other than that disclosed herein). In an embodiment, the improvement is measured by comparing the difference between free polyphenols and total polyphenols in the sample. A measurement of polyphenols present in the sample can provide information as to how much of the polyphenol was not oxidized, or was protected from oxidation. In an embodiment, the closer the amount of polyphenols in a processed sample is to the amount of polyphenols in a fresh or unprocessed sample, the greater the process protected the polyphenols in the sample from oxidation. In other words, the less the starting polyphenol concentration changes, the more protected, and therefore, the fresher and more potent the sample will be. In an embodiment, total polyphenols are measured. In an embodiment, free polyphenols are measured. In another embodiment, the ratio of the difference between the measured values for free and total polyphenols is used to evaluate the freshness or potency of a sample. In another embodiment, absolute values in differences between two samples are used as an indicator of freshness or potency of a sample.

In an embodiment, the compositions and methods set forth herein provide for maintenance of freshness and/or potency by providing stability over a period of time, wherein the stability is measured by inhibition of polyphenol oxidation. Polyphenol content can be measured using any known method, such as those disclosed elsewhere herein. In an embodiment, there is less than about 0.1% reduction in measured polyphenols, over a period of time. In another embodiment, there is less than about 0.2%, less than about 0.3%, less than about 0.4%, less than about 0.5%, less than about 0.6%, less than about 0.7%, less than about 0.8%, less than about 0.9%, less than about 1.0%, less than about 1.5%, less than about 2.0%, less than about 2.5%, less than about 3.0%, less than about 3.5%, less than about 4.0%, less than about 4.5%, or less than about 5.0% reduction in measured polyphenols, over a period of time. In another embodiment, there is less than about 6%, less than about 7%, less than about 8%, less than about 9%, less than about 10%, less than about 15%, less than about 20%, less than about 25%, less than about 30%, less than about 35%, less than about 40%, less than about 45%, less than about 50%, less than about 60%, less than about 70%, less than about 80%, or less than about 90% reduction in measured polyphenols, over a period of time. In an embodiment, the reduction in measured polyphenols is measured over about one hour. In another embodiment, the reduction in measured polyphenols is measured over about two hours, about five hours, about ten hours, about twelve hours, about fifteen hours, about twenty hours, about twenty-four hours, about thirty-six hours, about forty-eight hours, about sixty hours, about one week, about two weeks, about three weeks, about four weeks, about one month, about two months, about three months, about four months, about five months, about six months, about seven months, about eight months, about nine months, about ten months, about eleven months about twelve months, about one year, about 1.5 years, about 2 years, about 2.5 years, about 3 years, about 4 years, or about 5 years. In an embodiment, the reduction in measured polyphenols is measured over a period of greater than 5 years.

In an embodiment, disclosed herein is a method for preserving fresh herbs, the method comprising obtaining fresh trimmings from a plant, grinding and/or chopping the fresh trimmings to form processed trimmings, packaging the processed trimmings in a container, and freezing the processed trimmings, wherein the interior environment of the container contains substantially no oxygen. In an embodiment, a composition made according to such a method is disclosed. In an aspect, the container is substantially, but not completely, air-tight.

In an embodiment, disclosed herein is a method for preserving fresh herbs, the method comprising obtaining fresh trimmings from a plant, grinding and/or chopping the fresh trimmings to form processed trimmings, freezing the processed trimmings, and packaging the frozen processed trimmings in a container, wherein the interior environment of the container contains substantially no oxygen. In an embodiment, a composition made according to such a method is disclosed. In an aspect, the container is substantially air-tight. In another aspect, the container is not air-tight.

The invention is further described by the following examples. It should be recognized that variations based on the inventive features are within the skill of the ordinary artisan, and that the scope of the invention should not be limited by the examples. To properly determine the scope of the invention, an interested party should consider the claims herein, and any equivalent thereof. In addition, all citations herein are incorporated by reference, and unless otherwise expressly stated, all percentages are by weight.

Example 1—Control Sample Using Basil

This example describes the use of American Basil as the plant tested and grown under rigorous standards, as disclosed in the compositions and methods herein. In order for the process to be effective, the plants were hardened off, requiring wind, sun and soil to have the highest amount of photosynthesis, the least amount of inert moisture and to toughen up the leaf. One hundred-three to four leaf seedlings were placed in a ten by ten (10×10) square foot tilled plot at three (3) inches apart. This allowed for ease of yield calculations and best organic practices to be used and evaluated. These parameters were determined to be favorable and became the standard for growing this plant. These parameters minimized weed growth, increased the yield of a small amount of land and effectively utilized mechanical pest control methods, including beetle bags and beer pools for slugs. Planting time was six weeks before first harvest, including nipping any tops that wanted to "bolt" into flowers and pushing the growth back into leaf production. Three harvests of "American Basil" were obtained at three-week intervals at a yield of about twelve pounds of Basil for each plot, each time the leaves were harvested. For this particular example, it was determined that the best time to harvest was approximately 9:00 AM to 10:00 AM, as the plants were found to have the highest essential oils when harvested at that time. At that time, the morning dew has dissipated and wilt due to the heat of the day is not yet a factor. The extrapolated yield for one season for one (1) acre works out to be 249.5 lbs. per acre—a much higher yield than previously thought possible.

It should be noted that there are best growing methods and depending upon the percentages of phytochemicals desired in the final product and plant being processed. For example, the best genome combination for a strain of (medical) marijuana that works best for the intended use of the final product. As with all natural plants there are better tasting varieties that are preferable, and there are also varieties which have the most desirable levels of bioactive components. How well such characteristics stand up to the freezing processes and compositions taught herein can be determined by the skilled artisan, in view of the disclosure set forth herein.

This increased yield presented another problem to be solved, namely, what to do with all the harvested basil, as basil has a notoriously short shelf life. By using the methods and compositions disclosed herein, this basil harvest was used for up t two years without any appreciable loss of phytochemicals, antioxidants or loss of taste, according to results of laboratory testing. This is in contrast to dried product, which has very little taste compared to fresh. Even fresh herbs sold in the supermarket are typically a week or more old, in part, due to "first in first out" shelving practices. The hyponic Basil has too much internal moisture and not near the depth of flavor. In contrast, by way of example, the clam shell-style packaging used in conjunction with the compositions and methods disclosed herein to store fresh herbs have nitrogen gas infused to preserve shelf life.

Example 2—Fast Freezing Method

Fresh field clean plants were trimmed with a sharp knife by ⅓ of total plant height at the proper time and without any moisture due to rain or dew, and also without the presence of wilt due to full sun exposure and mid-day temperatures, as described herein. The trimmings were transported to a manufacturing facility is HACCP certified by the Department of Agriculture, then visually inspected and classified for taste and condition. Preferably, the highest quality herb is used for the fast freezing processes described herein. In the case of basil and some other herbs, if the trimmings do not meet the criteria, the trimmings are then used for pesto products, for example, where the flavor can be balanced with other ingredients. For highest quality, taste must be full bodied and smooth, not bitter. Detection of this quality requires a refined pallet and some skill. The trimmings undergo visual inspection for dirt, insect damage, wilt, yellow leaf or spot mold, which also requires knowledge of and familiarity with classification and sanitation codes.

The green leaf was then de-stemmed and batched to be weighed for raw yield, at a controlled temperature of about 50° F. The plant was then chopped by placing approximately 0.04 ounces of leaves into a CUISINART Model DLC-2A food processor, 120V, 60 HZ, 250 watt, with a reversible motor and double sided blade. This allows for a grind and chop function that, when quickly alternated, continuously aerates the product without damage to the tender leaf. Chopping was conducted by alternating chop and grind function at 3 second intervals for 18 seconds, always ending on the reverse function for fluff factor and reduction of weeping and bruising. The blade was two sided, 2.5 inches long, and has a high rate of RPM's in both directions. The blade was also removable for sharpening.

At this point in this method, timing was found to be crucial. If possible, several machines should be used at once to facilitate throughput. Chopped herb was placed into a hopper, at which point the herb was measured and packaged in approximately five minutes in order to minimize oxidation, weeping of moisture and darkening. From the batch, one (1) full measuring cup (2.2 ounces) of chopped herb was placed into a polypropylene, non-BPA recyclable plastic, seven-ounce wet-measurer container. In one embodiment, a seven ounce HDPE container was used with a 410 diameter LLDPE recessed TE lid. Due to a "fluff factor", there was a slight overfill, which was pushed and packed in by a ⅛ inch recessed tamper-resistant lid. Both parts of the package are U.S. Food and Drug Administration (FDA) approved and capable of withstanding temperatures of –81 degrees Celsius or –141 degrees Fahrenheit. This created a package that was essentially air tight, with a tamper resistant seal to be removed by the consumer. There were three tabs that would come off the lid when opened.

The package was then placed into a marine cooler, though a tunnel which is almost air tight could also be used. The marine cooler contained fifty pounds of dry ice that was cut into five 8×10×2 inch slabs that were approximately ten pounds each, placed at the bottom of the cooler. The package was placed directly on the dry ice for twenty five minutes, until fast frozen. When the package was pulled, the product was entirely frozen to –80° F. The plant never touched the dry ice, but was quickly semi-vacuum sealed due to the lack of oxygen created both in the package and the cooler. The dry ice essentially removed the oxygen. The density of plant material used allowed for "semi-vacuuming" and did not permit the formation of ice crystals. When kept frozen, the product will remain fresh for two years, having essentially the same levels of polyphenols at the time of freezing as compared to a later point in time within two years, according to the testing that has been preformed, and as described herein. In an aspect, food grade dry ice is used, as this is a food product and it would minimize the possibility of cross contaminating any surfaces in the clean room. Furthermore, a cold pasteurization process can be utilized to deal with any possible environmental contaminants, although these issues should be addressed by utilizing best organic practices in the field well before this point of processing.

Example 3—Polyphenol Content Analysis

The amount of free polyphenols and total polyphenols present in tarragon of different sources was undertaken. Fresh tarragon, week old fresh tarragon, frozen tarragon (measured upon freezing), frozen tarragon (measured after one year of storage), and tarragon frozen by ICF method were analyzed.

For analysis, each sample was flash-frozen by immersion in liquid nitrogen and ground into powder using a mortar and pestle. One hundred milligrams of each sample was placed into each of two test tubes: The first contained 8 ml methanol, to extract free polyphenols from the sample, and the second contained 8 ml 1.2M HCl in methanol, to extract total polyphenols. For each sample, both tubes were heated at 90° F. for two hours, then the resultant products transferred to 10 ml volumetric flasks. The polyphenol concentrations were determined using the Folin assay (Table 1).

TABLE 1

| | Total Polyphenol (mg/g herb) | Free Polyphenol (mg/g herb) |
|---|---|---|
| Fresh Tarragon | 1.320 | 0.709 |
| Fresh Tarragon, 1 week old | 0.804 | 0.583 |
| Frozen Tarragon (Measured Upon Freezing) | 0.689 | 0.469 |
| Frozen Tarragon (Measured After One Year Of Storage) | 0.893 | 0.620 |
| Tarragon Frozen By ICF Method | 0.815 | 0.586 |

The amount of free polyphenols in basil was also examined. Fresh basil was analyzed for free polyphenols and total polyphenols using the method as described above for tarragon. Basil was examined at 12 hours after harvesting and four days after harvesting (Table 2). After four days in refrigeration, basil lost 6.41% of free polyphenols and 12.0% total polyphenols.

TABLE 2

| | Total Polyphenol (mg/g herb) | Free Polyphenol (mg/g herb) |
|---|---|---|
| Fresh Basil, 12 hours after harvesting | 0.909 | 0.712 |
| Fresh Basil, 4 days after harvesting | 0.800 | 0.666 |

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for preserving fresh herbs, the method comprising:
   a. obtaining fresh trimmings from a plant;
   b. grinding and/or chopping the fresh trimmings to form processed trimmings, wherein the grinding and/or chopping occurs less than 36 hours from the time the fresh trimmings were obtained;
   c. packaging the processed trimmings in an interior environment of a container and providing a cover on the container that is configured to form a seal with the container; and
   d. freezing the processed trimmings after packaging the processed trimmings in the interior environment of the container, wherein freezing the processed trimmings comprises placing the container in a chamber containing dry ice, wherein the processed trimmings are never in direct contact with the dry ice, and wherein oxygen is removed from the interior environment of the container while the container is positioned in the chamber and a seal is formed between the cover and the container.

2. The preserved fresh herbs produced by the method according to claim 1.

3. The preserved fresh herbs of claim 2, wherein one or more organoleptic properties of the preserved fresh herbs are substantially identical to the one or more organoleptic properties of the fresh trimmings from the plant.

4. The method of claim 1, wherein the grinding and/or chopping occur less than 24 hours from the time the trimmings were obtained.

5. The method of claim 1, wherein the freezing occurs less than 30 minutes from the grinding and/or chopping.

6. The method of claim 5, wherein the grinding and/or chopping occur less than 24 hours from the time the trimmings were obtained.

7. The preserved fresh herbs according to claim 6.

8. The method of claim 1, wherein the fresh trimmings are obtained from a single plant.

9. The method of claim 1, wherein the fresh trimmings are obtained from at least two different plants.

10. The method of claim 1, wherein the fresh herbs consist of one type of herb.

11. The method of claim 1, wherein the fresh herbs comprise two or more different types of herbs.

12. The method of claim 1, wherein, upon thawing one year after freezing of the processed trimmings, the processed trimmings have at least 75% of the otherwise identical polyphenols measured immediately prior to freezing.

13. The method of claim 1, wherein the freezing comprises subjecting the processed trimmings to dry ice temperatures.

14. The method of claim 1, wherein the freezing comprises subjecting the processed trimmings to a dry ice atmosphere.

15. The method of claim 1, wherein the plant comprises one or both of marijuana and hemp.

16. A method for preserving a fresh weed or bud of a plant, the method comprising:
   a. obtaining fresh trimmings from the plant;
   b. grinding and/or chopping the fresh trimmings to form processed trimmings, wherein the grinding and/or chopping occurs less than 36 hours from the time the fresh trimmings were obtained;
   c. packaging the processed trimmings in an interior environment of a container and providing a cover on the container that is configured to form a seal with the container; and
   d. freezing the processed trimmings after packaging the processed trimmings in the interior environment of the container, wherein freezing the processed trimmings comprises placing the container in a chamber containing dry ice, wherein the processed trimmings are never in direct contact with the dry ice, and wherein oxygen is removed from the interior environment of the container while the container is positioned in the chamber and a seal is formed between the separate cover and the container.

17. The preserved fresh weed or bud according to claim 16.

18. The method of claim 16, wherein the freezing occurs less than 30 minutes from the grinding and/or chopping.

19. A method for preserving plant material from a plant, the method comprising:
   a. obtaining fresh trimmings from the plant;
   b. grinding and/or chopping the fresh trimmings to form processed trimmings, wherein the grinding and/or chopping occurs less than 36 hours from the time the fresh trimmings were obtained;
   c. packaging the processed trimmings in an interior environment of a container and providing a cover on the container that is configured to form a seal with the container; and
   d. freezing the processed trimmings after packaging the processed trimmings in the interior environment of the container, wherein freezing the processed trimmings comprises placing the container in a chamber containing dry ice, wherein the processed trimmings are never in direct contact with the dry ice, and wherein oxygen is removed from the interior environment of the container while the container is positioned in the chamber and a seal is formed between the separate cover and the container.

20. The method of claim 19, wherein the freezing occurs less than 30 minutes from the grinding and/or chopping.

* * * * *